(12) United States Patent
Landi

(10) Patent No.: US 7,527,849 B2
(45) Date of Patent: May 5, 2009

(54) HONEYCOMB SHOCK ABSORBER

(75) Inventor: Curtis L. Landi, San Jose, CA (US)

(73) Assignee: Supracor, Inc., San Jose, CA (US)

( * ) Notice: Subject to any disclaimer, the term of this patent is extended or adjusted under 35 U.S.C. 154(b) by 266 days.

(21) Appl. No.: 11/205,465

(22) Filed: Aug. 16, 2005

(65) Prior Publication Data

US 2006/0061027 A1 Mar. 23, 2006

Related U.S. Application Data

(60) Provisional application No. 60/603,033, filed on Aug. 19, 2004.

(51) Int. Cl.
*B32B 3/12* (2006.01)
*B32B 3/04* (2006.01)
*B60G 13/00* (2006.01)
*F16D 57/00* (2006.01)

(52) U.S. Cl. .................. 428/116; 428/121; 267/195; 188/266; 156/245

(58) Field of Classification Search ............. 428/593, 428/116, 117, 121; 188/266; 267/195; 156/245
See application file for complete search history.

(56) References Cited

U.S. PATENT DOCUMENTS

| | | | |
|---|---|---|---|
| 2,704,587 A * | 3/1955 | Pajak | 428/118 |
| 5,039,567 A | 8/1991 | Landi et al. | |
| 5,110,653 A | 5/1992 | Landi | |
| 5,122,405 A * | 6/1992 | Landi | 428/116 |
| 6,439,358 B1 | 8/2002 | Brück et al. | |
| 6,574,947 B2 * | 6/2003 | Landi et al. | 54/65 |
| 6,666,941 B2 * | 12/2003 | Nakamura | 156/155 |
| 2001/0015087 A1 * | 8/2001 | Diewald et al. | 72/371 |
| 2002/0152730 A1 | 10/2002 | Landi et al. | |
| 2003/0218326 A1 * | 11/2003 | Banyas | 280/777 |

FOREIGN PATENT DOCUMENTS

| | | |
|---|---|---|
| EP | 0 429 320 | 5/1991 |
| EP | 1 365 169 | 11/2003 |
| FR | 0668218 | * 8/1995 |

* cited by examiner

*Primary Examiner*—Timothy M Speer
*Assistant Examiner*—Gordon R Baldwin
(74) *Attorney, Agent, or Firm*—Claude A.S. Hamrick; IPxLaw Group LLP

(57) ABSTRACT

A honeycomb shock absorbing unit or assembly formed from a honeycomb panel. In one embodiment, the shock absorber unit includes a cylindrical member formed of a folded or rolled honeycomb panel, and a flange formed by bonding the opposing ends of the honeycomb panel seamed together. In a shock absorbing system, the flange of the honeycomb shock absorbing unit can be connected to another structure.

2 Claims, 4 Drawing Sheets

HONEYCOMB SHOCK ABSORBER

CROSS REFERENCE TO RELATED APPLICATIONS

This application claims priority to U.S. Provisional Patent Application No. 60/603,033, filed Aug. 19, 2004, which is incorporated herein by reference in its entirety.

FIELD OF THE INVENTION

The present invention relates generally to shock absorbing devices and more particularly to a shock absorbing unit or assembly found from at least one honeycomb panel folded or rolled to provide a generally cylindrical unit that can be used individually or combined with other units or structures to form a shock absorbing assembly.

BACKGROUND

A shock absorber is an implement used to absorb the force of an impact or jolt. Shock absorbers are used for a variety of applications, from automobiles and airplanes in which very complex devices are coupled to wheel assemblies to absorb tremendous forces caused by motion over an uneven terrain, to shoes in which very simple devices such as foam panels are provided to lessen the impact of steps taken on a surface.

Generally, but not always, the functional effectiveness of a shock absorber is proportionally related to its cost and/or complexity. However, complex shock absorber assemblies typically are not aesthetically pleasing or suitable for aesthetic as well as functional applications.

SUMMARY

Briefly the present invention includes a shock absorbing unit or combination of units formed from a honeycomb panel. In one embodiment, the shock absorbing unit includes a cylindrical member formed of a folded or rolled honeycomb panel, and a flange formed by bonding the opposing ends of the honeycomb panel seamed together. In a shock absorbing system, the flange of the honeycomb shock absorbing unit can be connected to another structure.

The details of several embodiments of the present invention are illustrated in the accompanying drawings and described in the description below. Other features, objects, and advantages will be apparent from the description and drawings, and from the claims.

BRIEF DESCRIPTION OF THE DRAWINGS

These and other aspects of the invention will now be described in detail with reference to the several figures of the drawing.

Like reference symbols in the various drawings indicate like elements.

DETAILED DESCRIPTION

Figure 1A:
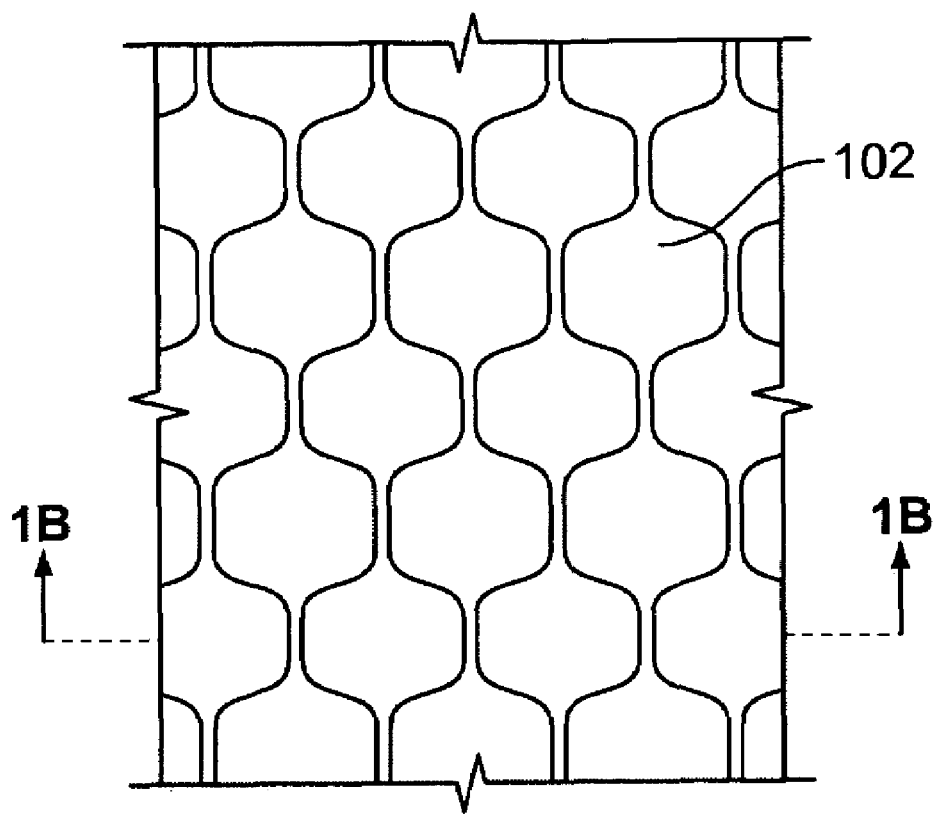
FIGS. 1A and 1B are plan and cross-sectional views showing an example of a honeycomb structure used as the starting material of the present invention.
Figure 1B:
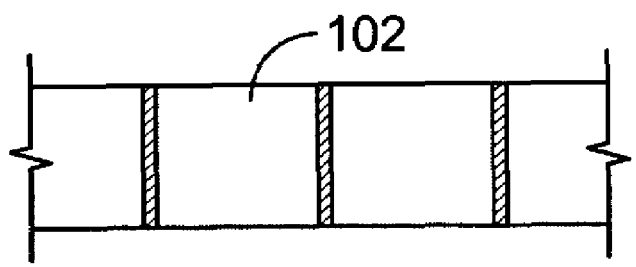

Referring now to the drawing, FIGS. 1A and 1B show an example of a honeycomb structure having a number of cells 102. The cells 102 are generally hexagonal in shape, and can be elongated or symmetrical. Alternatively, the cells can have other shapes, for example, square shape, triangle shape, circle shape, and oval shape. The cells are approximately one quarter of an inch in diameter. Alternatively, the cells can be of any dimension, such as one-eighth of an inch in diameter or smaller to two inches in diameter or larger. FIG. 1B shows a cross section of the honeycomb structure in which cells 102 are spaced apart by sidewalls of other cells.

Figure 2:
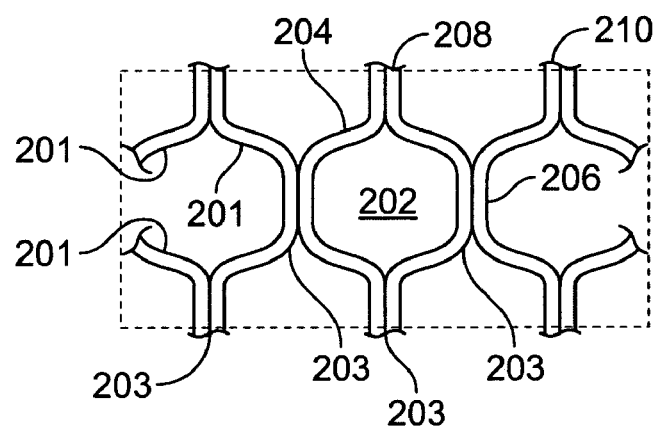
FIG. 2 shows detail of honeycomb cells.

FIG. 2 shows a segment of a honeycomb structure constructed from a plurality of resilient thermoplastic ribbons 201 layed out in contiguous parallel relationship to each other and intermittently bonded together at 203 and then expanded to form a network of cells 202. Accordingly, each cell 202 is defined by an arrangement of two adjacent ribbons, where each ribbon forms side walls of the cells. Some side walls, e.g., wall 206, are formed by two ribbons bonded together, and are thicker than their other side walls, e.g. wall 204. For example, side wall 206 of cell 202 is made from ribbons 208 and 210. The honeycomb structure and thermoplastic ribbons are similar in type and manufacture to those described in commonly assigned U.S. Pat. No. 5,039,567 to Landi et al. ("the '567 patent"), which is hereby incorporated by reference.

Cells of the honeycomb structure can be hermetically sealed so as to trap air or other fluids within the cells. The trapped fluid compresses upon cell deformation to provide additional compressive absorption. The cells can be sealed by, for example, bonding thermoplastic or facing sheets to the top and bottom edges of the ribbons that define the cell walls. Alternatively, cell walls can include perforations through which fluids can be pumped and dispersed among cells. The top and/or bottom edges of the ribbons can be planarized by, for example, application of thermoforming energy to the edges. The ribbons can have a color; and different ribbons of a honeycomb structure may have different colors for aesthetic effects. Each ribbon has a specific resiliency, thickness or weight. Different ribbons may have different resiliencies, thicknesses, or weights for functional or performance effects.

Figure 3:
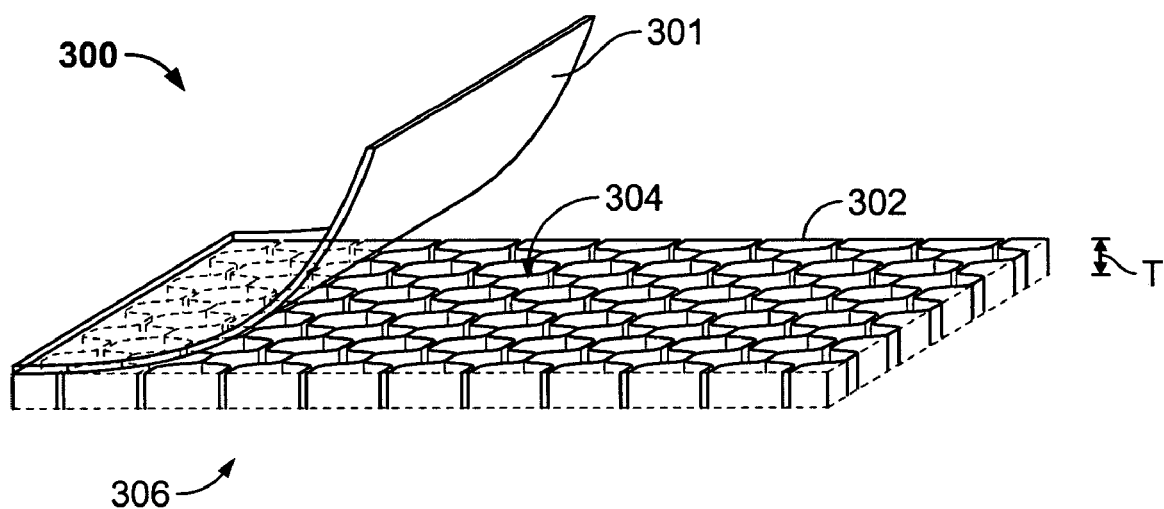
FIG. 3 shows a honeycomb panel.

FIG. 3 shows a honeycomb panel 300 or sheet having a thickness T and formed of a plurality of cells 302. The thickness T can be any thickness height. The honeycomb panel 300 can include a facing sheet 301 applied to the top 302 and/or bottom face of the honeycomb panel. It should be understood that the terms "top" and "bottom" as used herein are provided merely for reference and example, and are not intended as limitations of any particular orientation or arrangement of the honeycomb panel. The honeycomb panel 300 can be formed of ribbons (as described in the '567 patent) of uniform color, resiliency, thickness or weight, or of ribbons of varying color, resiliency, thickness or weight. The resiliency of the cells 302 of honeycomb panel 300 provides a cushioning effect to a force applied onto them.

Figure 4A:
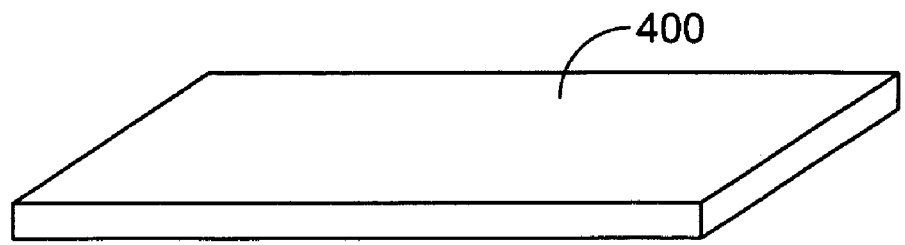
FIGS. 4A-4E illustrate a method of making a generally cylindrical shock absorbing unit from a honeycomb panel.
Figure 4B:
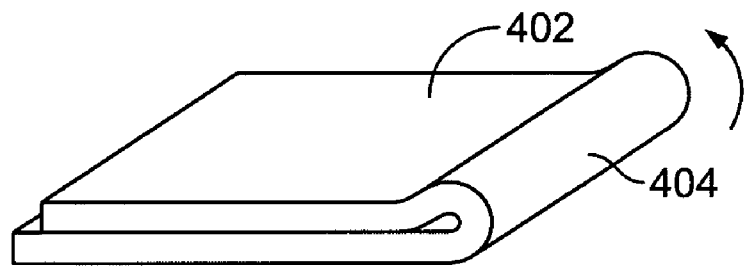
Figure 4C:
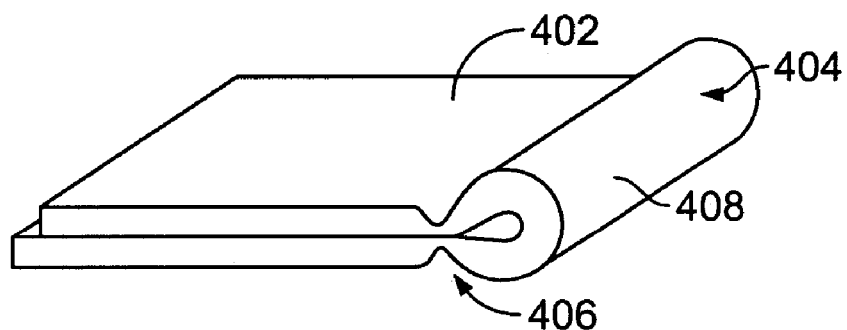

FIGS. 4A through 4E illustrate a method of forming a honeycomb shock absorber in accordance with the present invention. As shown in FIG. 4A, a honeycomb panel 400 is provided, similar to that described in reference to FIG. 3. The panel is folded onto itself such that one part of the top face is juxtaposed against another part of the top face, as shown in FIG. 4B, to form a folded panel 402. As FIG. 4C shows the folded panel is compressed along a transverse line to form a pinched seam 406 across at least a substantial portion of the panel's width and at a preferably uniform, predetermined distance from the folded or rolled extremity 404 of the panel to form a generally cylindrical portion 408. The seam 406 may be formed by application of thermal and/or radio frequency energy to the top and/or bottom of the folded panel 402. Other mechanisms for forming the seam 406 may also be used.

Figure 4D:
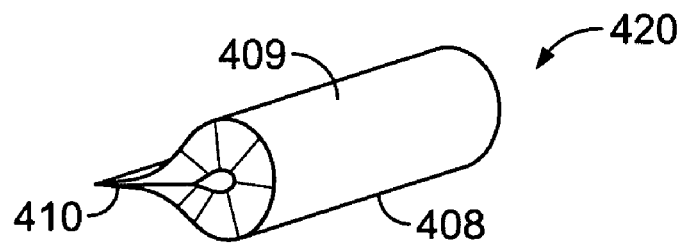
Figure 4E:
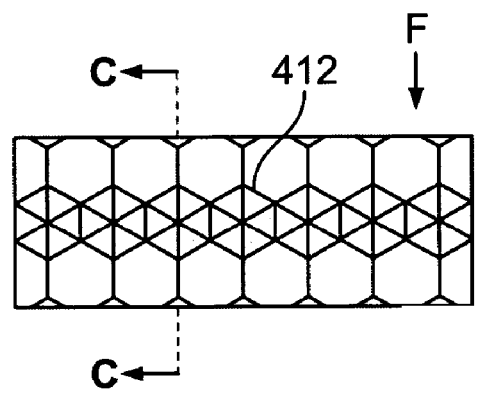

The seam is then cut, as shown in FIG. 4D, to separate the cylindrical portion 408 from the rest of the panel 402, leaving a honeycomb shock absorber 420 comprised of a generally cylindrical part 409 and a flange part 410. The flange 410 may be trimmed and/or smoothed to provide a more uniformly straight line. The flange 410 may also be pinched further for providing extra flanged surface area. FIG. 4E is a side view of the cylindrical portion 408 showing a number of cells 412, in which side walls of each cells are collapsed into the cell and/or toward the central axis of the cylindrical portion 408 due to the curvature of the fold that creates the cylindrical portion 408. In one embodiment, in which the cells are formed of translucent ribbons and/or face sheets, the result is that each cell resembles a precious cut stone or jewel.

The honeycomb shock absorber 420 is configured to absorb force F or compression at any angle from an axis running through the center of the cylindrical portion 408, and most efficiently at an angle normal to the axis running through the center of the cylindrical portion 408.

Figure 5:
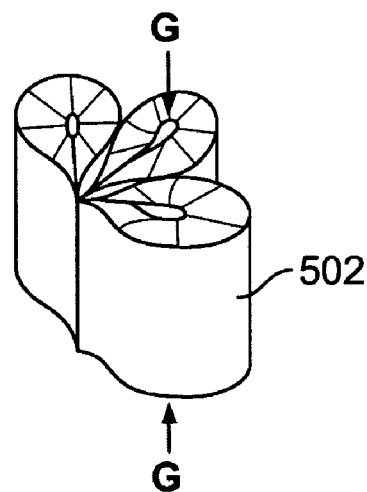
FIG. 5 shows an alternative embodiment and application of a honeycomb shock absorbing assembly.

FIG. 5 illustrates another embodiment of a honeycomb shock absorber 502 in accordance with the present invention, in which each generally cylindrical honeycomb structure 502 can be sized and oriented to absorb force or compression at any angle relative to the axis G running through the center of a cylindrical portion of the shock absorber 502. With reference to FIG. 4E, the cylindrical portion 408 and flange can be cut along a cut line C, at predetermined lengths, to yield shock absorber units of any longitudinal length. These units can be assembled into groups of two or more units 502 to provide force absorption across an area filled by the honeycomb shock absorber 502.

Figure 6:
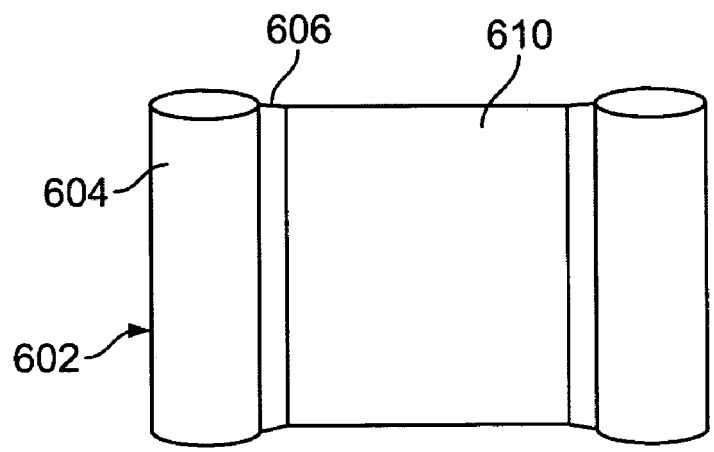
FIG. 6 shows another alternative embodiment of a honeycomb shock absorbing assembly.

The honeycomb shock absorbers according to the embodiments disclosed herein may also be coupled with other structures. For example, FIG. 6 shows a honeycomb unit 602 including a cylindrical portion 604 and a flange 606. The honeycomb unit 602 is connected to generally planar structure 610 at the flange 606. The structure 610 can be another honeycomb shock absorber unit 602, a planar honeycomb panel, a ribbed honeycomb panel, a rigid planar panel, or any other type of structure. The honeycomb shock absorber 602 can be connected by, for example, thermoforming the flange 606 to an edge of the structure 610, or by any other connecting mechanism or method. Accordingly, one or more honeycomb shock absorbers 602 can act as a "bumper" or cushioning cord for the structure 610.

In further summary, the present invention relates to a process for manufacturing a shock absorbing unit that can be used alone or in combination with other units or structures. A presently preferred embodiment of the process includes the steps of a) thermal compression bonding together a plurality of sheets of plastic material to form a laminated block wherein bonds between adjacent sheets are along regularly spaced rows with the bond rows between alternating sheets being laterally offset relative to the bond rows between the other sheets;

b) cutting a core strip from the block by severing the block along a plane intersecting the block normal to both the length of the bond rows and the surfaces of each sheet;

c) expanding said core strip to form a honeycomb shaped core having cells of a particular configuration, the cells forming openings extending from a first core face on a first side of the core to a second core face on a second side of the core;

d) thermal compression bonding a facing sheet of resilient material to at least one of the core faces by simultaneously applying heat and pressure to the joinder of the facing sheet and a corresponding core face to form a honeycomb panel having opposing panel faces;

e) folding a portion of the honeycomb panel along a fold line extending across one of the panel faces such that a portion of the panel face on one side of the fold line contacts a portion of the panel face on the opposite side of the fold line;

f) providing a seam joining the panel faces together, the seam extending along a line generally parallel to the fold line; and g) severing the folded and seamed portions of the panel from the remainder of the panel to form an elongated, generally cylindrically shaped shock absorbing unit.

Although a few embodiments of the invention have been described in detail above, other embodiments, alterations and modifications are contemplated that may fall within the scope of the following claims.

The invention claimed is:

1. A shock absorbing unit, comprising:
 a honeycomb core made by thermal compression bonding a plurality of sheets of plastic material together to form a laminated block wherein the bonds between adjacent sheets are disposed along regularly spaced parallel rows with the bond rows between alternating sheets being laterally offset relative to the bond rows between the other sheets;
 a core strip cut from the block by severing the block along a plane intersecting the block normal to both the length of the bond rows and the surfaces of each sheet, the core strip being expanded to form a honeycomb shaped core having cells of a particular configuration, the cells forming openings extending from a first core face on a first side of the core to a second core face on a second side of the core;
 a facing sheet of resilient material thermal compression bonded to at least one of the core faces by simultaneously applying heat and pressure to the junction of the facing sheet and a corresponding core face to form a honeycomb panel having opposing panel faces;
 a portion of said honeycomb panel being folded along a fold line extending across one of said panel faces such that a first portion of said one panel face on one side of said fold line contacts a second portion of said one panel face on the opposite side of said fold line; and
 a seam joining said first and second portions of said one panel face together, said seam extending along a line generally parallel to said fold line, the portion of said panel outside the seam being severed from the remainder of said panel to form an elongated, generally cylindrical shaped shock absorbing unit.

2. A shock absorbing unit as recited in claim 1, further comprising a plurality of said generally cylindrical shaped shock absorbing units having their respective seamed portions joined together.

* * * * *